Patented Nov. 12, 1935

2,020,934

UNITED STATES PATENT OFFICE 2,020,934

MANUFACTURE OF BENZYL CELLULOSE

Eduard Dörr, Wuppertal-Elberfeld, Germany, assignor, by mesne assignments, to Hercules Powder Company, Wilmington, Del., a corporation of Delaware No Drawing. Application June 22, 1932, Serial No. 618,810. In Germany June 29, 1931

14 Claims. (Cl. 260—152)

The present invention relates to the manufacture of benzyl cellulose and in particular to an improved process for the isolation of pure benzyl cellulose from a crude benzyl cellulose reaction mass.

Benzyl cellulose is generally produced on a technical scale by the action of benzyl chloride on alkali cellulose, especially soda cellulose. The crude benzyl cellulose reaction mass thus obtained represents a tough, gum-like product containing, besides water, sodium chloride and caustic soda, considerable quantities of oily by-products, such as benzyl alcohol and dibenzyl ether, and also excess benzyl chloride.

Up to the present time the purification of the crude benzyl cellulose reaction mass on a commercial scale presented considerable difficulties; thus, for example, for removing the oily components, i. e. benzyl chloride, benzyl alcohol and dibenzyl ether, the mass was extracted for several days with a suitable solvent, such as ligroin, methanol and ethanol. However, the penetration of the reaction mass by the solvents is a very poor one due to the tough and coherent properties of the mass and thus, finally, the benzyl cellulose was generally obtained in form of small solid lumps still containing impurities in the interior. The complete purification of the benzyl cellulose lumps thus obtained was rather impossible, and even after several week's washing with hot water the lumps may contain salts in the interior. The grinding of the mass prior to the extraction also did not give satisfactory results.

According to the present invention the working up of the crude benzyl cellulose reaction mass is considerably improved by converting the crude benzyl cellulose reaction mass into a consistent foamy mass, and extracting and washing this foamy mass according to the methods used in the art. Due to the highly increased surface of the crude benzyl cellulose reaction mass the extraction of the oily by-products can be performed in a fraction of the time heretofore required for said purpose. By means of the extraction the benzyl cellulose is obtained in the form of a pure white, uniformly flocculent mass from which the salts and caustic alkali contained therein can easily and rapidly be removed. Although the extracting and washing of the benzyl cellulose is performed in a much shorter time compared with that required in the processes heretofore used, a higher degree of purity is attained according to the process of the present invention.

The conversion of the crude benzyl cellulose reaction mass into a consistent foamy mass, having favorably the consistency of whipped cream, can be performed in any convenient manner known in the art of producing dispersions in liquid mediums. Good results can be achieved without any further additions by intensely stirring or beating the mass. It is, however, of advantage to add a small quantity of one of the known dispersing agents generally used for emulsifying purposes and producing the foamy mass by thoroughly mechanically agitating the crude benzyl cellulose reaction mass. As dispersing agents suitable for the purpose of my invention there may be mentioned by way of example: soap and the like products, such as other water-soluble salts of higher fatty acids, the sodium salt of oleic acid and the products obtained according to the processes described in Brit. Patents Nos. 341,053, 343,899 and 343,524. The quantity of the dispersing agent added somewhat depends on the water content of the crude benzyl cellulose reaction mass and the specific dispersing agent used; as a rule it may be stated that from about 1 to about 10%, preferably about 5%, by weight of the crude reaction mass are incorporated therewith. A preferred method of carrying out my process consists in producing the dispersing agent within the crude benzyl cellulose reaction mass, if possible, whereby right from the beginning a uniform distribution of the dispersing agent in the crude benzyl cellulose reaction mass is attained. This can be achieved, for example, by converting the caustic soda present in the crude benzyl cellulose reaction mass into a soap, for instance, by means of oleic acid. If desired, substances splitting off gases, such as small quantities of ammonium salts, may be added to the mass which still contains a solution of caustic soda. Owing to the liberation of ammonia, the product becomes still more foamy and voluminous.

The mass thus prepared is slowly introduced, while stirring into the extracting agent, such as ligroin, methanol or ethanol. The foam is destroyed and before being extracted the benzyl cellulose sinks to the bottom as an extremely finely divided powder which does not show a tendency to bake together or coagulate. After the first extracting agent has been removed, for example, by filtration with suction, the benzyl cellulose, if necessary, is treated with fresh extracting agent until it is completely freed from the oily by-products. It is then washed with water until free from common salt and caustic soda.

In accordance with this new and simple method the benzyl cellulose is obtained in a technically high grade of purity, which so far was unknown. It is precipitated as a fine, flocculent product, excellent for further working up, because, due to its large surface it dissolves easily in a very short time, when mixed with a solvent.

The invention is illustrated by the following examples without being limited thereto, the parts being by weight.

Example 1

100 parts of a crude benzyl cellulose reaction mass are freed from the major portion of the common salt and caustic soda contained therein by means of washing with water. Into the tough, gum-like mass 10 parts of potash soap are stirred or kneaded. After a short time a uniform, foamy, rather consistent mass is formed. This is introduced in portions into 500 parts of methanol while thoroughly stirring. The benzyl cellulose sinks to the bottom as a fine flocculent precipitate. It is extracted two or three times with methyl alcohol, washed with water until free from common salt and caustic soda and dried at 80–90° C. Thus the benzyl cellulose is obtained as a fine, flocculent, pure white product, suitable for the further working up into lacquers, films and other shaped artificial masses.

Example 2

A crude benzyl cellulose reaction mass may be treated in accordance with the directions given in Example 1. Into the foamy mass formed by means of the potash soap 5 parts of ammonium carbonate are introduced while stirring. By means of the ammonia set free a still more voluminous and foamy mass is formed which is then introduced into the extracting agent, such as liquor, or methanol, and worked up in accordance with the directions given in Example 1.

The process may also be carried out in such a manner that the components necessary for the soap formation, such as oleic acid and alkali hydroxide or soda, are added separately to the crude benzyl cellulose.

Example 3

60 parts of a crude benzyl cellulose reaction mass are freed from the major portion of the common salt and caustic soda contained therein by means of washing with water of 60–70° C., acidified with 0.5 parts of acetic acid, and then 1.5 parts of oleic acid are added. After the mass is homogeneously kneaded 2 parts of soda are added. The foamy mass which is formed after a short time is introduced into 60 parts of methanol while stirring, and the process is further carried out in accordance with the directions given in Example 2.

When larger quantities of salts, for instance, of soda are added to the emulsion the soap formed is salted out. A spongy mass is formed which likewise can be worked up easily.

I claim:

1. In the process of separating benzyl cellulose from a crude benzyl cellulose reaction mass, the step which comprises incorporating a water soluble soap with the crude benzyl cellulose reaction mass and converting the crude benzyl cellulose reaction mass into a consistent foamy mass by malaxating it prior to the extraction with organic solvents and water.

2. In the process of separating benzyl cellulose from a crude benzyl cellulose reaction mass, the step which comprises incorporating with the crude benzyl cellulose reaction mass the sodium salt of oleic acid and converting the crude benzyl cellulose reaction mass into a consistent foamy mass by malaxating it prior to the extraction with organic solvents and water.

3. In the process of separating benzyl cellulose from a crude benzyl cellulose reaction mass, the step which comprises producing the sodium salt of oleic acid in said mass and converting the crude benzyl cellulose reaction mass into a consistent foamy mass by malaxating it prior to the extraction with organic solvents and water.

4. In the process of separating benzyl cellulose from a crude benzyl cellulose reaction mass, the step which comprises converting the crude benzyl cellulose reaction mass into a consistent foamy mass by malaxating it in the presence of a foam-forming dispersing agent prior to the extraction of the mass with organic solvents and water.

5. In the process of separating benzyl cellulose from a crude benzyl cellulose reaction mass, the step which comprises incorporating with the crude benzyl cellulose reaction mass a foam-forming dispersing agent and converting it into a consistent foamy mass prior to the extraction with organic solvents and water.

6. In the process of separating benzyl cellulose from a crude benzyl cellulose reaction mass, the step which comprises producing a foam-forming dispersing agent in the crude benzyl cellulose reaction mass and converting the crude benzyl cellulose reaction mass into a consistent foamy mass by malaxating it prior to the extraction with organic solvents and water.

7. In the process of separating benzyl cellulose from a crude benzyl cellulose reaction mass, the step which comprises producing a water soluble soap in said mass and converting the crude benzyl cellulose reaction mass into a consistent foamy mass by malaxating it prior to the extraction with organic solvents and water.

8. The process of separating benzyl cellulose from a crude benzyl cellulose reaction mass which comprises converting the crude benzyl cellulose reaction mass into a consistent foamy mass by malaxation in the presence of a foam-forming dispersing agent, introducing the foamy mass into an organic solvent, extracting the resultant precipitate with an organic solvent, and washing the precipitate with water.

9. The process of separating benzyl cellulose from a crude benzyl cellulose reaction mass which comprises converting the benzyl cellulose reaction mass into a consistent foamy mass by malaxation in the presence of a foam-forming dispersing agent, adding a substance capable of splitting off gas in the reaction mass, extracting the mass with an organic solvent and washing the benzyl cellulose with water.

10. The process of separating benzyl cellulose from a crude benzyl cellulose reaction mass which comprises converting the benzyl cellulose reaction mass into a consistent foamy mass by malaxation in the presence of a foam-forming dispersing agent, adding an ammonium salt to the reaction mass, extracting the mass with an organic solvent, and washing the benzyl cellulose with water.

11. The process of separating benzyl cellulose from a crude benzyl cellulose reaction mass which comprises converting the crude benzyl cellulose reaction mass into a consistent foamy mass, precipitating benzyl cellulose from the foamy mass with an organic solvent, extracting the precipitated benzyl cellulose with an organic solvent, and washing the precipitated benzyl cellulose with water.

12. The process of separating benzyl cellulose from a crude benzyl cellulose reaction mass which comprises adding a fatty acid to the crude benzyl cellulose reaction mass for the formation of a soap therein by reaction with contained alkali, malaxating the crude benzyl cellulose reaction mass for the formation of a consistent foamy mass, and extracting the foamy mass with organic solvents and water.

13. The process of separating benzyl cellulose from a crude benzyl cellulose reaction mass which comprises converting the crude benzyl cellulose reaction mass into a consistent foamy mass by malaxation in the presence of a foam-forming dispersing agent, introducing the foamy mass into methanol, extracting the resultant precipitate with methanol, and washing the precipitate with water.

14. In the process of separating benzyl cellulose from a crude benzyl cellulose reaction mass, the step which comprises incorporating with the crude benzyl cellulose reaction mass a foam-forming dispersing agent in amount of about 1% to about 10% by weight of the reaction mass and converting it into a consistent foamy mass prior to the extraction with organic solvents and water.

EDUARD DÖRR.